Figure 1:
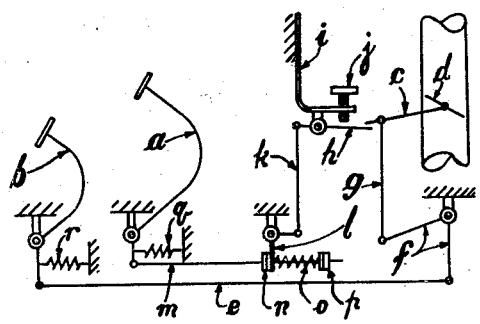

May 6, 1941.   N. B. NEWTON   2,240,712
POWER TRANSMISSION SYSTEM
Filed Sept. 25, 1937

Inventor:-
Noel Banner Newton
Walter Lund

By his Attorney:

Patented May 6, 1941

2,240,712

UNITED STATES PATENT OFFICE 2,240,712

POWER TRANSMISSION SYSTEM

Noel Banner Newton, Acton, London, England

Application September 25, 1937, Serial No. 165,676
In Great Britain September 30, 1936

17 Claims. (Cl. 192—.01)

This invention relates to power transmission systems and more particularly to systems comprising in combination a friction clutch or its equivalent and variable speed gearing such as used for the transmission systems of mechanically propelled vehicles.

The trend of modern design, particularly with mechanically propelled vehicles, has been to simplify gear changing so that it can be effected without requiring any special skill. The epicyclic gear box was probably the first step in that direction but was followed by the synchro-mesh gear box owing to certain constructional problems and disadvantages of the epicyclic gear. Then came the fluid flywheel and the centrifugal automatic clutch, the former being essentially limited to the epicyclic type of gear or some combination embodying friction clutch mechanism, while the latter was capable of use with any type of gear box.

These and other developments have, however, without exception, given rise to other problems all of which are allied to the same cause, namely that gear-changing in a modern transmission system is possible whether or not the engine speed is synchronised for the new gear ratio; so that the clutch or other friction member of the transmission system is then required to synchronise the engine speed for such gear ratio. The skilled driver who has graduated on the old type of clutch and gear box will probably automatically, approximately synchronise the engine speed to the near gear ratio prior to final engagement of the clutch, or other transmission control member, but it is now becoming recognised that such skillful use of the transmission is exceptional, whether from lack of skill, or laziness, and manufacturers of such transmission are now faced with the problem of increased wear of the friction elements of clutches and gear selectors, and damage due to excessive strains, especially reverse strains, which are applied to the whole transmission system, in consequence of such lack of synchronisation.

In connection with the automatic centrifugal clutch there is a special problem additional to that of wear and damage already described, and due to the self-disengaging action thereof, accentuated by the light flywheel construction of modern internal combustion engines as used on private cars. If a driver takes rather long in changing gear, as is necessary with some types of synchro-mesh gearing and merely declutches while doing so, the engine revolutions may, before the clutch pedal is released, fall below the critical speed for centrifugal automatic re-engagement. Until the engine revolutions fall below such critical speed the re-engagement of the clutch will occur, as with an ordinary clutch with release of the pedal, and complete the gear change, though the friction elements will be required to transmit power for speeding up the engine to the synchronised speed for that gear, causing both wear and reverse stresses to the system, but once the revolutions fall below such critical speed, a free wheel action results, the clutch failing to re-engage on release of the clutch pedal. The special and additional problem then arises if the driver uses the accelerator without keeping a control pressure on the clutch pedal because, as soon as the engine revolutions reach the critical speed, the centrifugal elements automatically throw in the clutch so as to impose sudden shock and reverse strain on the whole transmission. It is only too easy with a modern engine with light flywheel to obtain such shock effect, especially when changing to a lower gear.

The object of the invention is to overcome the general and special problems of excessive wear and shock above explained.

According to the invention means are provided interconnecting the clutch control with the engine speed control so as to operate the latter to maintain or raise the engine speed to a predetermined extent during operation of the clutch pedal.

Figure 2:
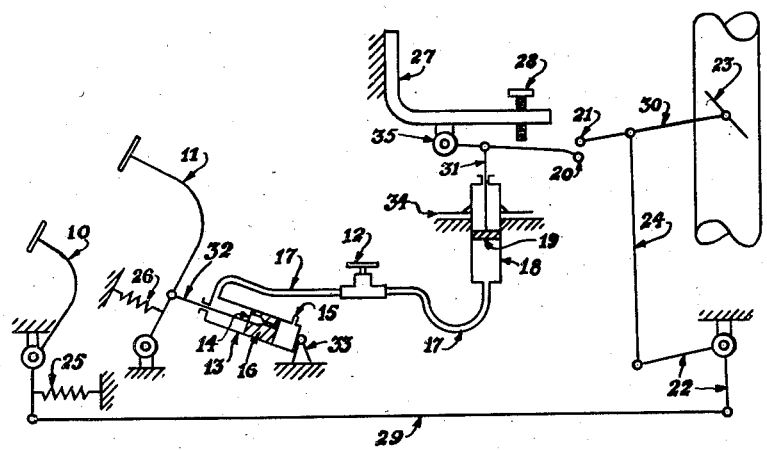
Figure 3:
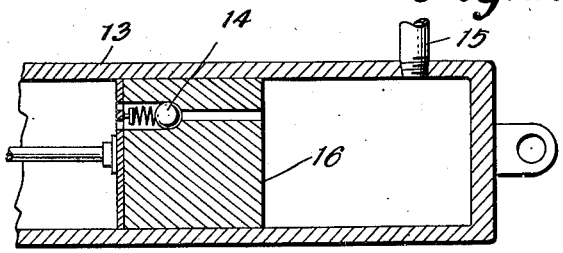

In the accompanying drawing Fig. 1 illustrates diagrammatically one example of the invention. Fig. 2 shows an alternative form of the invention suitable for a motor propelled vehicle. Fig. 3 is an enlarged view of the unit 13 illustrated in Fig. 2.

In Fig. 1 a clutch pedal $a$ is shown for operating the clutch withdrawal mechanism of an automatic centrifugal clutch and an accelerator pedal $b$. The pedal $b$ is connected to the arm $c$ of the throttle butterfly $d$ by a link $e$, bell crank lever $f$ and a further link $g$. The arm $c$ has an extension adapted to be engaged by a trip lever $h$ supported in a bracket $i$ having an adjustable screw stop $j$. The lever $h$ is connected by a link $k$ to one arm of a bell crank lever $l$. The pedal $a$ is connected by a link rod $m$ to the other arm of the bell crank lever, the rod passing through a hole in the arm and carrying adjustable nuts $n$ to form an adjustable stop on one side of the arm and a spring $o$ on the other side of the arm with other nuts $p$ by which the spring tension can be adjusted. The pedals a and b have return springs q and r respectively.

The action of the accelerator pedal b to open the throttle butterfly, is obvious. The other mechanism operates as follows: Depressing the pedal a pulls the rod m and by reason of the spring o rocks the bell crank lever l pulls down the link k and tilts the tripping lever h until the latter engages its stop screw j. In so moving, the lever h engages the extension of the butterfly throttle lever c and opens the throttle according to the adjustment of the stop screw j. The spring o allows the pedal to be depressed further after the trip member has reached its stop and maintains the throttle butterfly in the predetermined partly open position until the pedal has returned beyond the position for clutch re-engagement.

The control of the car in traffic is normally obtained by means of the brake and throttle alone, owing to the automatic action of the centrifugal clutch. When changing gear however, at speeds of engine revolutions above the critical speed for automatic engagement, the driver will be required to depress the clutch pedal a. Thereupon, the engine throttle will be partly opened or kept from being completely closed so that the engine revolutions will tend to rise or fall towards a predetermined speed of say 450 revs./min. Although such speed may not be the correct speed for synchronisation of the engine speed for the gear selected, it is found in practice that for ordinary everyday purposes it more nearly approximates to true synchronisation than if the engine throttle were not so controlled. If suitably adjusted for any particular car and driver, the resultant approach to synchronisation is immediately obvious from the fact that surging of the car upon clutch re-engagement is much reduced or even eliminated, even if the clutch re-engagement is deliberately sudden. Consequently, clutch wear and reverse shocks and strains to the transmission are substantially reduced or eliminated. As regards the special conditions obtaining with centrifugal clutches, so long as the throttle trip setting is adjusted by means of the screw j to raise the engine revolutions above the critical speed for automatic clutch engagement, the same can never revert to the free wheel position while the clutch pedal is held depressed, as during gear changing, and the driver is always made to feel, as with an ordinary clutch, that clutch engagement is under his control by the pedal a. At the same time, synchronisation for normal purposes is more nearly approached as above explained.

In Fig. 2 there is a clutch pedal 11 for operating the clutch. The accelerator pedal 10, which is returned to its normal position by the spring 25 operates the butterfly 23 of the carburettor, through a lever 30 and bell crank 22 and links 24 and 29. The lever 30 has an extension 21. This extension is arranged to be operated by a trip lever 20 supported in a bracket 27 having an adjustable set screw 28. The clutch pedal 11 is returned to its normal position by the spring 26. Connected to the clutch pedal is an air cylinder 13 by a rod 32 on the end of which is a piston 16. In the piston is a suitable one-way valve, for example, a non-return ball valve 14. To the end of the cylinder 13 is attached a bracket 33. A tube 17 connects the air cylinder 13, which is open to the atmosphere at 15 with an air cylinder 18, which is held by a bracket 34. In the cylinder 18 is a piston 19 having a rod 31 which is connected to the lever 20. The lever 20 is fulcrumed at the point 35 in the bracket 27. Situated on the tube 17 is an adjustable leak valve 12. The mechanism operates as follows: On depressing the clutch pedal 11 the movement is transmitted to the piston 16 which sucks in a charge of air through the non-return ball valve 14. Up to this point no relative movement is transmitted to the piston 19 of the cylinder 18, but on allowing the clutch pedal 11 to go back to its normal position, i. e., to re-engage the clutch, a compression of air is generated in the cylinder 13 which is transferred to the cylinder 18 causing a movement of the piston 19 and the rod 31. This moves the lever 20 as far as the adjusting screw 28 will allow it. This causes the lever 20 to engage with the extension 21 of the lever 30. The leak valve 12 is so adjusted that sufficient pressure is maintained in the cylinder 18 to hold the lever 20 up against the set screw 28 for a short period. The butterfly valve therefore, is held in a predetermined open position for a matter of some seconds after the clutch pedal is re-engaged.

Whilst the example shown in Fig. 1 is suitable for the centrifugally-controlled clutch, the method shown in Fig. 2 is preferable for a normal foot-operated clutch. Where it is necessary to drive slowly under traffic conditions with the clutch held out by the foot, the engine speed is not increased until the pedal is returned to its normal position. It is therefore possible to use the method set out in Fig. 2 without the engine turning over at a high rate of revolutions in traffic driving. At the same time it will have the effect, when changing gear, of increasing the revolutions of the engine immediately before re-engagement of the clutch, thereby synchronising, to a certain degree, the engine speed with the car speed.

It becomes obvious from the above explanation that the invention would apply to transmission systems embodying a clutch and gear box combination of any kind and will reduce clutch wear and shock and strains to the system.

It is also obvious that the invention would apply to any transmission system embodying a fluid flywheel and epicyclic gear, as it would still operate to produce approximation to synchronisation and thereby reduce the wear of the friction bands or other selective control elements of the gear, it being remembered that except when starting from rest, the fluid flywheel has approximately only 2% to 8% slip or yield and the major portion of the take-up on changing gear devolves on the said friction bands, etc.

The invention is obviously not limited to the examples of mechanism above described.

What I claim is:

1. Power transmission control mechanism for mechanically propelled vehicles having clutch withdrawal means and an engine speed control means, in combination with means for interconnecting the clutch withdrawal means with the engine speed control means said interconnecting means comprising a mechanical connection actuated by the clutch withdrawal means and including a permissively operated link, and a trip member connected to be moved by said link and having lost motion engagement with the engine speed control means whereby to raise the engine speed above idling speed during operation of the clutch withdrawal means.

2. Power transmission control mechanism for mechanically propelled vehicles having clutch withdrawal means and an engine speed control means, in combination with means for interconnecting the clutch withdrawal means with the engine speed control means, said interconnecting means comprising a mechanical connection actuated by the clutch withdrawal means and including a spring pressed link arranged for permissive operation, and a trip member connected to be moved by said link and having lost motion engagement with the engine speed control means whereby the latter operates to raise the engine speed above a critical speed for the clutch which occurs during operation of the clutch withdrawal means.

3. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever, said connection being such that upon operating of the clutch pedal the tripping lever engages the throttle lever and maintains the same partly open, whereby the engine speed is prevented from falling below the critical speed in automatic clutch engagement when the clutch pedal is operated.

4. Power transmission control mechanism for mechanically propelled vehicles having clutch withdrawal means and engine speed control means connected with a throttle valve, the improvement which comprises a throttle lever extending from said valve, a tripping lever mounted in proximity thereto, an adjustable stop member with which said tripping lever is adapted to make contact to adjust the throttle valve opening when said levers are in engagement and to raise the engine speed above the critical speed for automatic clutch engagement, a clutch pedal connected to said tripping lever, said connection being such that upon operating of the clutch pedal the tripping lever engages the throttle lever and maintains the same partly open, whereby the engine speed is prevented from falling below the critical speed in automatic clutch engagement when the clutch pedal is operated.

5. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever, said connection being such that upon operating of the clutch pedal the tripping lever engages the throttle lever and maintains the same partly open, and means interposed between said pedal and tripping lever to allow further depression of said pedal whereby said throttle valve is maintained in said partly open position until said pedal is returned beyond the position for clutch re-engagement, whereby the engine speed is prevented from falling below the critical speed in automatic clutch engagement when the clutch pedal is operated.

6. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever by a connected series of links and cranks, said connection being such that upon operating of the clutch pedal the tripping lever engages the throttle lever and maintains the same partly open, whereby the engine speed is prevented from falling below the critical speed in automatic clutch engagement when the clutch pedal is operated.

7. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever by fluid pressure transmission devices including a pair of cylinders, pistons therein, said pedal and tripping lever being connected to its respective piston and a tube connecting said cylinders, said connection being such that upon operating of the clutch pedal the tripping lever engages the throttle lever and maintains the same partly open, whereby the engine speed is prevented from falling below the critical speed in automatic clutch engagement when the clutch pedal is operated.

8. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever, said connection being such that upon operating of the clutch pedal the tripping lever engages the throttle lever and maintains the same partly open, and means interposed between said pedal and tripping lever including a spring-biased member to allow further depression of said pedal whereby said throttle valve is maintained in said partly open position until said pedal is returned beyond the position for clutch re-engagement, whereby the engine speed is prevented from falling below the critical speed in automatic clutch engagement when the clutch pedal is operated.

9. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever by fluid pressure transmission devices including a pair of cylinders, pistons therein, said pedal and tripping lever being connected to its respective piston and a tube connecting said cylinders having a leak valve therein, said connection being such that upon operating of the clutch pedal the tripping lever engages the throttle lever and maintains the same partly open, whereby the engine speed is prevented from falling below the critical speed in automatic clutch engagement when the clutch pedal is operated.

10. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever by fluid pressure transmission devices including a pair of cylinders, pistons therein, said pedal and tripping lever being connected to its respective piston and a tube connecting said cylinders, said connection being such that upon operating of the clutch pedal the tripping lever engages the throttle lever and maintains the same partly open, said clutch pedal being so connected with its piston that upon depressing of said pedal there is no engagement of said levers but on release of said pedal the change of pressure in the system operates the throttle valve, whereby the engine speed is prevented from falling below the critical speed in automatic clutch engagement when the clutch pedal is operated.

11. Power transmission control mechanism for mechanically propelled vehicles having clutch withdrawal means and engine speed control means connected with a throttle valve, the improvement which comprises a throttle lever extending from said valve, a tripping lever mounted in proximity thereto, a clutch pedal connected to said tripping lever, said connection being such that upon release of the clutch pedal the tripping lever engages the throttle lever and maintains the same partly open, whereby the engine speed is prevented from falling below the critical speed in automatic clutch engagement when the clutch pedal is operated with the return operation only of said clutch pedal.

12. In power transmission control mechanism for mechanically propelled vehicles having a centrifugally controlled friction clutch which is self-engaging at a critical speed and is provided with a clutch pedal for voluntary clutch withdrawal and engine speed control means including a throttle valve normally adapted to return to slow running engine position, the improvement which comprises mechanism connecting the clutch pedal to the throttle valve so that movement of the clutch pedal during voluntary operation of the clutch operates the throttle to maintain an engine speed above the said critical speed of the clutch at least immediately prior to re-engagement of the clutch.

13. In power transmission control mechanism for mechanically propelled vehicles having a centrifugally controlled friction clutch which is self-engaging at a critical speed, and is provided with a clutch pedal for voluntary clutch withdrawal and engine speed control means including a throttle valve adapted to return to a slow-running engine position the improvement which comprises a trip lever operably associated with the clutch pedal and the throttle valve to open the throttle on operation of the clutch pedal for clutch withdrawal so as to provide an engine speed above the said critical speed of the clutch.

14. In power transmission control mechanism for mechanically propelled vehicles having a centrifugally controlled friction clutch which is self-engaging at a critical speed and is provided with a clutch pedal for voluntary clutch withdrawal and engine speed control means including a throttle valve adapted to return to a slow-running engine position, the improvement which comprises a lever extending from the throttle valve, a tripping lever mounted in close proximity thereto and connecting means between the tripping lever and the clutch pedal, said connecting means being such that upon initial movement of the clutch pedal preceding actual disengagement of the clutch tripping lever engages the throttle lever and opens and maintains the same partly open sufficient to maintain an engine speed, when de-clutched, in excess of the critical speed of the clutch and wherein said connecting means allows further depression of the clutch pedal whereby said throttle is held in the said partly open position until said pedal is returned beyond the position for clutch re-engagement.

15. In power transmission control mechanism for mechanically propelled vehicles having a centrifugally controlled friction clutch which is self-engaging at a critical speed and is provided with a clutch pedal for voluntary clutch withdrawal and engine speed control means including a throttle valve adapted to return to a slow-running engine position, the improvement which comprises a lever extending from the throttle valve, a tripping lever mounted in close proximity thereto and connecting means between the tripping lever and the clutch pedal, said connecting means being such that upon initial movement of the clutch pedal preceding actual disengagement of the clutch the tripping lever engages the throttle lever and opens and maintains the same partly open sufficient to maintain an engine speed, when de-clutched, in excess of the critical speed of the clutch and wherein said connecting means allows further depression of the clutch pedal whereby said throttle is held in the said partly open position until said pedal is returned beyond the position for clutch re-engagement, said connecting means comprising a series of links and cranks embodying a spring member to permit further movement of the clutch pedal in combination with a stop to limit the movement of the trip lever.

16. In power transmission control mechanism for mechanically propelled vehicles having a centrifugally controlled friction clutch which is self-engaging at a critical speed and is provided with a clutch pedal for voluntary clutch withdrawal and engine speed control means including a throttle valve adapted to return to a slow-running engine position, the improvement which comprises a lever extending from the throttle valve, a tripping lever mounted in close proximity thereto and connecting means between the tripping lever and the clutch pedal, said connecting means being such that upon initial movement of the clutch pedal preceding actual disengagement of the clutch the tripping lever engages the throttle lever and opens and maintains the same partly open sufficient to maintain an engine speed, when declutched, in excess of the critical speed of the clutch and wherein said connecting means allows farther depression of the clutch pedal whereby said throttle is held in the said partly open position until said pedal is returned beyond the position for clutch re-engagement, said connecting means comprising a series of links and cranks embodying a spring member to permit further movement of the clutch pedal in combination with an adjustable stop to limit the movement of the trip lever.

17. In power transmission control mechanism for mechanically propelled vehicles having a centrifugally controlled friction clutch which is self-engaging at a critical speed and is provided with a clutch pedal for voluntary clutch withdrawal and engine speed control means including a throttle valve adapted to return to a slow-running engine position, the improvement which comprises a lever extending from the throttle valve, a tripping lever mounted in close proximity thereto and connecting means between the tripping lever and the clutch pedal, said connecting means being such that upon initial movement of the clutch pedal preceding actual disengagement of the clutch the tripping lever engages the throttle lever and opens and maintains the same partly open sufficient to maintain an engine speed, when de-clutched, in excess of the critical speed of the clutch and wherein said connecting means allows farther depression of the clutch pedal whereby said throttle is held in the said partly open position until said pedal is returned beyond the position for clutch re-engagement, said connecting means comprising elastic fluid pressure transmission devices including a pair of cylinders, pistons therein, said clutch pedal and tripping lever being connected to its respective piston, a tube connecting said cylinders, an adjustable stop limiting the movement of the trip lever, whereby upon movement of the clutch pedal preceding actual clutch re-engagement the tripping lever moves to a position engaging the said stop opening the throttle sufficient to maintain an engine speed, when de-clutched in excess of the critical speed of the clutch, the resilient fluid permitting further movement of the clutch pedal whilst holding the tripping lever against its stop until the pedal is returned beyond the position for clutch re-engagement and a leak for the resilient fluid to permit return movement of the trip lever.

NOEL BANNER NEWTON.